United States Patent
Bell et al.

(10) Patent No.: US 10,268,561 B2
(45) Date of Patent: Apr. 23, 2019

(54) USER INTERFACE ERROR PREDICTION

(71) Applicant: INTERNATIONAL BUSINESS MACHINES CORPORATION, Armonk, NY (US)

(72) Inventors: David R. Bell, Hursley (GB); Darren J. Sullivan, Hursley (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 128 days.

(21) Appl. No.: 15/049,215

(22) Filed: Feb. 22, 2016

(65) Prior Publication Data

US 2017/0242740 A1    Aug. 24, 2017

(51) Int. Cl.
*G06F 11/07* (2006.01)
*G06F 11/34* (2006.01)
(Continued)

(52) U.S. Cl.
CPC ...... *G06F 11/3438* (2013.01); *G06F 3/04847* (2013.01); *G06F 11/0706* (2013.01); *G06F 11/079* (2013.01); *G06F 11/0751* (2013.01); *G06F 11/0769* (2013.01); *G06F 11/0772* (2013.01); *G06F 11/0775* (2013.01);
(Continued)

(58) Field of Classification Search
CPC .............. G06F 11/079; G06F 11/0706; G06F 11/0751; G06F 11/0772; G06F 11/0775; G06F 11/3438; G06F 17/273; G06F 17/274; G06F 17/2818; G06F 17/243
See application file for complete search history.

(56) References Cited

U.S. PATENT DOCUMENTS 5,572,423 A * 11/1996 Church ................. G06F 17/273
                                                    715/257
5,812,122 A *  9/1998 Ng ....................... G06F 11/3664
                                                    714/E11.208
(Continued)

FOREIGN PATENT DOCUMENTS

WO    WO2015023201 A2    2/2015

OTHER PUBLICATIONS

Kernighan, M. D., Church, K. W., & Gale, W. A. (Aug. 1990). A spelling correction program based on a noisy channel model. In Proceedings of the 13th conference on Computational linguistics—vol. 2 (pp. 205-210). Association for Computational Linguistics.*

(Continued)

*Primary Examiner* — Paul Contino
(74) *Attorney, Agent, or Firm* — Richard Wilhelm, Esq.; Wayne F. Reinke, Esq.; Heslin Rothenberg Farley & Mesiti P.C.

(57) ABSTRACT

Errors are predicted in a user interface interaction. User interactions in a user interaction session are recorded. The user interactions form a recorded user interaction pattern. The recorded user interaction pattern is checked for a similar match against a set of error patterns, in which each error pattern is an historical user interaction pattern associated with an historical error status. A user is notified that the recorded user interaction pattern is an error risk, based on the recorded user interaction pattern being similar to an error pattern that has generated an historical error.

17 Claims, 6 Drawing Sheets

(51) Int. Cl.
*G06F 17/24* (2006.01)
*G06F 17/27* (2006.01)
*G06F 17/28* (2006.01)
*G06F 3/0484* (2013.01)

(52) U.S. Cl.
CPC .......... *G06F 17/243* (2013.01); *G06F 17/273* (2013.01); *G06F 17/274* (2013.01); *G06F 17/2818* (2013.01)

(56) References Cited

U.S. PATENT DOCUMENTS

| | | | |
|---|---|---|---|
| 7,647,530 B2* | 1/2010 | Britt | H04L 41/0631 714/43 |
| 7,676,445 B2 | 3/2010 | Fry et al. | |
| 7,730,364 B2 | 6/2010 | Chang et al. | |
| 7,900,089 B2* | 3/2011 | Hayutin | G06F 11/3668 714/26 |
| 8,078,560 B2* | 12/2011 | Takata | G06F 9/4446 706/45 |
| 8,140,337 B2* | 3/2012 | Nakazawa | G06F 17/30719 704/231 |
| 8,332,765 B2 | 12/2012 | Ergan et al. | |
| 9,009,544 B2* | 4/2015 | Cook | G06F 11/36 714/48 |
| 9,026,856 B2* | 5/2015 | Hecox | G06F 11/0706 714/38.1 |
| 9,600,401 B1* | 3/2017 | Haischt | G06F 11/3664 |
| 2003/0191987 A1* | 10/2003 | Brown | G06F 11/3636 714/38.14 |
| 2003/0236775 A1* | 12/2003 | Patterson | G06F 9/4443 |
| 2005/0044495 A1* | 2/2005 | Lee | G06F 17/2223 715/257 |
| 2005/0251744 A1* | 11/2005 | Brill | |
| 2005/0257198 A1* | 11/2005 | Stienhans | G06F 11/3672 717/124 |
| 2007/0130528 A1* | 6/2007 | Johnson | G06F 9/4443 715/761 |
| 2007/0240062 A1* | 10/2007 | Christena | G06F 3/04842 715/741 |
| 2008/0034286 A1* | 2/2008 | Selby | G06F 21/31 715/256 |
| 2008/0178102 A1* | 7/2008 | Kannan | G06F 9/451 715/764 |
| 2008/0235633 A1* | 9/2008 | Ghiloni | G06F 11/3676 715/862 |
| 2009/0320002 A1* | 12/2009 | Peri-Glass | G06F 8/38 717/131 |
| 2010/0145647 A1* | 6/2010 | Bouchard | G06F 11/0733 702/85 |
| 2011/0229036 A1* | 9/2011 | Reffle | G06K 9/03 382/182 |
| 2011/0314343 A1* | 12/2011 | Hoke | G06F 11/3672 714/45 |
| 2012/0078627 A1* | 3/2012 | Wagner | G06F 17/273 704/235 |
| 2012/0166869 A1 | 6/2012 | Young et al. | |
| 2014/0281708 A1* | 9/2014 | Adam | G06F 11/1443 714/18 |
| 2017/0024269 A1* | 1/2017 | Shuvali | G06F 11/0772 |

OTHER PUBLICATIONS

Jurafsky, Dan. Spelling Correction and the Noisy Channel: The Spelling Correction Task. 2012. Stanford University Natural Language Processing.*

Zhang et al., "Run-time Systems Failure Prediction via Proactive Monitoring," Proceedings of the 2011 26th IEEE/ACM International Conference on Automated Software Engineering, Nov. 2011, pp. 484-487.

Lorenzoli et al., "Towards Self-Protecting Enterprise Applications," 18th IEEE International Symposium on Software Reliability, Nov. 2007, pp. 39-48.

* cited by examiner

| Record Identifiers 251A | Interaction Pattern Table 250A (for GUI P500) | | | | | | |
|---|---|---|---|---|---|---|---|
| | Error Patterns 252A | Errors 254A | | | Occurrences 256A | | |
| | | All | User1 | User2 | All | User1 | User2 |
| R1 | P502/HTTP | 0 | 0 | 0 | 31 | 22 | 9 |
| R2 | .+P504/443 | 0 | 0 | 0 | 8 | 3 | 5 |
| R3 | .. +P506 | 0 | 0 | 0 | 8 | 3 | 5 |
| R4 | .+P504/480 | 0 | 0 | 0 | 8 | 4 | 4 |
| R5 | .. +P506 | 6 | 2 | 4 | 7 | 3 | 4 |
| R6 | P502/HTTPS | 0 | 0 | 0 | 20 | 11 | 9 |
| R7 | .+P504/443 | 0 | 0 | 0 | 7 | 3 | 4 |
| R8 | ..+P506 | 3 | 2 | 1 | 7 | 3 | 4 |
| R9 | .+P504/80 | 0 | 0 | 0 | 7 | 2 | 5 |
| R10 | ..+P506 | 0 | 0 | 0 | 7 | 2 | 5 |

Figure 4A

| Record Identifiers 251B | Interaction Pattern Table 250B (for GUI P500) | | |
|---|---|---|---|
| | Error Patterns 252B | Errors 254B | Occurrences 256B |
| | | All | All |
| R1 | P502/HTTP | 0 | 31 |
| R2 | P502/HTTP+P504/443 | 0 | 8 |
| R3 | P502/HTTP+P504/443+P506 | 0 | 8 |
| R4 | P502/HTTP+P504/480 | 0 | 8 |
| R5 | P502/HTTP+P504/480+P506 | 6 | 7 |
| R6 | P502/HTTPS | 0 | 20 |
| R7 | P502/HTTPS+P504/443 | 0 | 7 |
| R8 | P502/HTTPS+P504/443+P506 | 3 | 7 |
| R9 | P502/HTTPS+P504/80 | 0 | 7 |
| R10 | P502/HTTPS+P504/80+P506 | 0 | 7 |

Figure 4B

| Set up network GUI P500 | P501 | - | ☐ | X |

| P502 Protocol: | |
| P504 Port: | |
| P506 Set up Button |

Figure 5A

| Set up network GUI P500 | P501 | - | ☐ | X |

| P502 Protocol: | HTTPS |
| P504 Port: | 443 |
| P506 Set up Button |

P508 Notification. Possible Error. HTTPS and port 443 resulted in an error for 3 out of 7 users

Figure 5B

| Set up network GUI P500 | P501 | - | ☐ | X |

| P502 Protocol: | HTTP |
| P504 Port: | 443 |
| P506 Set up Button |

P510 Notification. 8 out of 8 users selecting HTTP and port 443 had a successful set up.

Figure 5C

USER INTERFACE ERROR PREDICTION

BACKGROUND

One or more aspects of the present invention relate to user interface error prediction. In particular, one or more aspects relate to predicting runtime errors before an issue occurs which causes the error in a user interface.

A known error predication system spots possible spelling errors or unusual words in a string by checking the string against references in a fixed dictionary; if the system does not find a match, then it is assumed that a mistake has been made. New references can be added to the dictionary. Such a system works on a single input field to determine if the string is in the dictionary or not.

SUMMARY

Shortcomings of the prior art are overcome and additional advantages are provided through the provision of a computer-implemented method of predicting errors in a user interface interaction. The computer-implemented method includes, for instance, recording user interactions in a user interaction session, the user interactions forming a recorded user interaction pattern; checking the recorded user interaction pattern for a similar match against a set of error patterns, wherein each error pattern is an historical user interaction pattern associated with an historical error status; and notifying a user that the recorded user interaction pattern is an error risk, based on the recorded user interaction pattern being similar to an error pattern that has generated an historical error.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Embodiments of the present invention will now be described, by way of example only, with reference to the following drawings in which:

FIG. 4A is an example interaction pattern table of an embodiment;
FIG. 4B is an example interaction pattern table of an alternative embodiment;
and
FIGS. 5A, 5B and 5C are schematic screen shots showing example states of a graphical user interface (GUI) of one embodiment.

DETAILED DESCRIPTION

Figure 1:
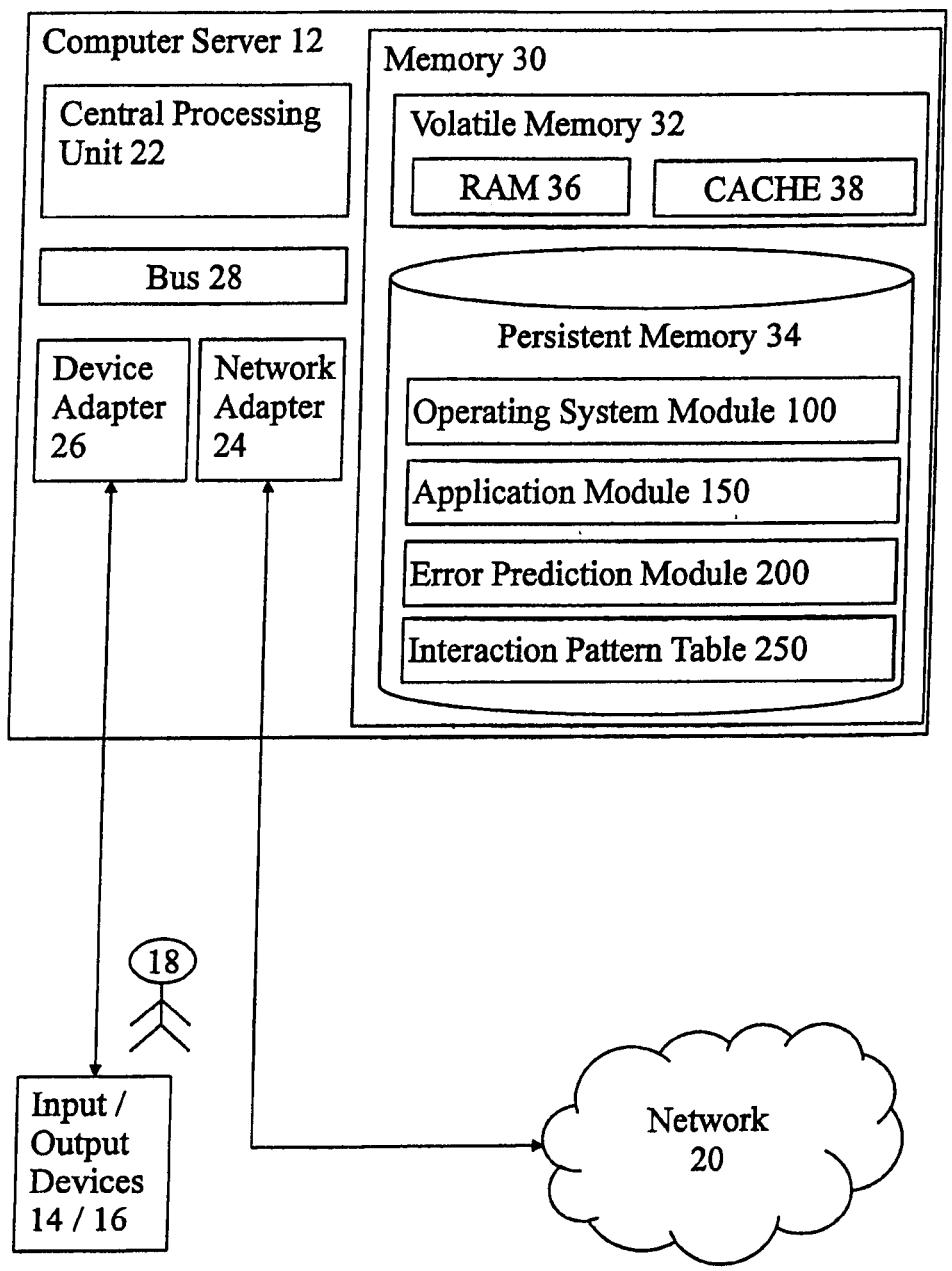
FIG. 1 is a deployment diagram of an embodiment.

Referring to FIG. 1, the deployment of an embodiment of an error prediction system 10 is described. Error prediction system 10 is operational with numerous other general purpose or special purpose computing system environments or configurations. Examples of well-known computing processing systems, environments, and/or configurations that may be suitable for use with error prediction system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices. A distributed computing environment includes a cloud computing environment for example where a computer processing system is a third party service performed by one or more of a plurality of computer processing systems. A distributed computing environment also includes an Internet of things computing environment, for example, where computer processing systems are distributed as a network of objects that can interact with a computing service.

Error prediction system 10 may be described in the general context of computer system executable instructions, such as program modules, being executed by a computer processor. Generally, program modules may include: routines; programs; objects; components; logic; and data structures that perform particular tasks or implement particular abstract data types. Error prediction system 10 may be embodied in distributed cloud computing environments where tasks are performed by remote processing devices that are linked through a communications network. In a distributed cloud computing environment, program modules may be located in both local and remote computer system storage media including memory storage devices.

Error prediction system 10 comprises: general purpose computer server 12 and one or more input devices 14 and output devices 16 directly attached to the computer server 12. Error prediction system 10 is connected to a network 20. Error prediction system 10 communicates with a user 18 using input devices 14 and output devices 16. Input devices 14 include one or more of: a keyboard; a scanner; and a mouse, trackball or other pointing device. Output devices 16 include one or more of a display or a printer. Error prediction system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to as a low level language. A computer program written in a high level language is to be compiled to a machine code program before it can be run. Alternatively, a machine code program, such as a virtual machine or an interpreter, can interpret a high level language in terms of machine operations.

Network adapter 24 is for enabling communication between the computer server 12 and network devices.

Device adapter 26 is for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Error prediction system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The program modules configured to carry out the functions of one embodiment comprise: operating system module 100; application module 150; error prediction module 200 and interaction pattern table 250. In one embodiment, ROM in the memory 30 stores error prediction module 200 that enables the computer server 12 to function as a special purpose system specific to the error prediction module 200. Further program modules that support embodiments but are not shown include firmware, a boot strap program, and support applications. Each of the operating system; support applications; other program modules; and program data; or some combination thereof; may include an implementation of a networking environment.

Error prediction system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with error prediction system 10. Examples, include, but are not limited to: microcode, device drivers, redundant processing units, external disk drive arrays, a redundant array of independent disks (RAID), tape drives, and data archival storage systems.

Operating system module 100 comprises a basic input and output system process that may be controlled by a user or by an application. Such basic processes include: graphical user interface (GUI) functions; and loading, running and saving applications including interaction with the user through the GUI functions.

Application module 150 comprises instructions for the processor to perform a user application that takes user interactions. In one example, the application is for setting up a network connection using a graphical user interface (GUI) 500 (FIG. 5), and in other embodiments, the application can be any user interface for any purpose that may or may not result in errors along with the intended purpose.

Error prediction module 200 is for performing an embodiment.

Interaction pattern table 250 is for storing the user interaction pattern data including user interaction error patterns in one embodiment.

Figures 2A, 2B:
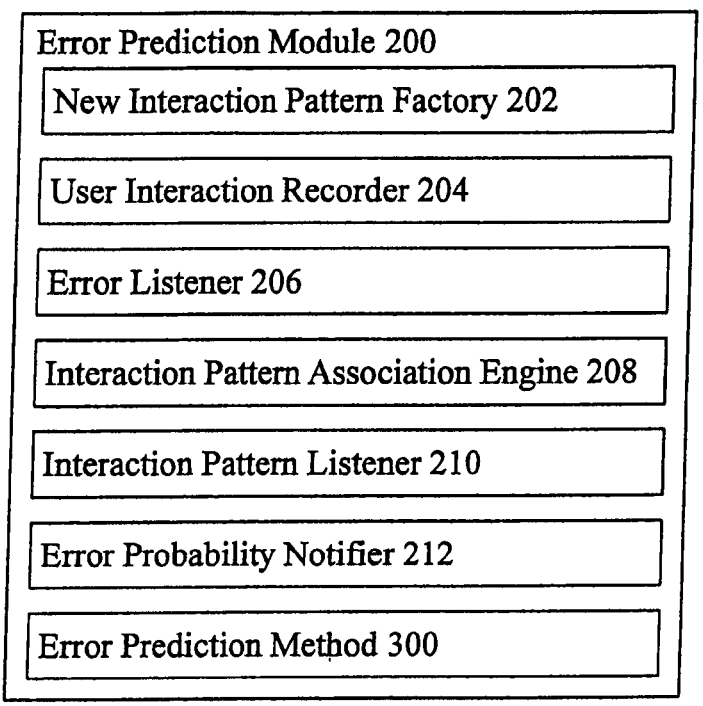
FIGS. 2A-2B are component diagrams of an embodiment.

Referring to FIG. 2A, error prediction module 200 comprises the following components: new interaction pattern factory 202; user interaction recorder 204; error listener 206; interaction pattern association engine 208; interaction pattern listener 210; error probability notifier 212; and error prediction method 300.

New interaction pattern factory 202 is for creating an empty interaction pattern record in the interaction pattern table 250 at the start of a user interaction session.

User interaction recorder 204 is for recording an individual user interaction as part of a user interaction pattern in a user interaction session.

Error listener 206 is for discovering if an error is caused by the user interface in the user interaction session.

Interaction pattern association engine 208 is for determining which parts of the recorded user interaction pattern to associate with an error.

Interaction pattern listener 210 is for determining if the user interaction pattern is associated with an error pattern.

Error probability notifier 212 is for notifying a user that the user interaction pattern has a probability of an error if it is associated with an error pattern. Optionally, a probability of the recorded interaction pattern and/or the actual error pattern are notified to the user.

Error prediction method 300 is for controlling the error prediction module components to perform the embodiment.

As shown in FIG. 2B, Interaction pattern table 250 comprises error pattern records. Each error pattern record comprises a user interaction pattern; a value for the total number of occurrences of the errors pattern; and a value for the number of errors for the error pattern occurrences. In one embodiment, the total number of occurrences of the error pattern is stored because an error may not always occur for a particular user interaction pattern. In the examples, a simple user interaction pattern is used for ease of explanation, but a user interaction pattern can be any size, can be a sub-pattern of another pattern, can overlap another pattern and can be for more than one GUI. For example, a user can add four values to fields on a first GUI interface (on a first interface page) and add five values to five more fields on a second GUI interface (on another interface page). Each action of entering a value in each individual field can be an individual interaction pattern. The first four values together on the first GUI can be another interaction pattern, as can the five together on the second GUI. Furthermore, the nine values together across two different GUIs can be another user interaction pattern.

Figure 3:
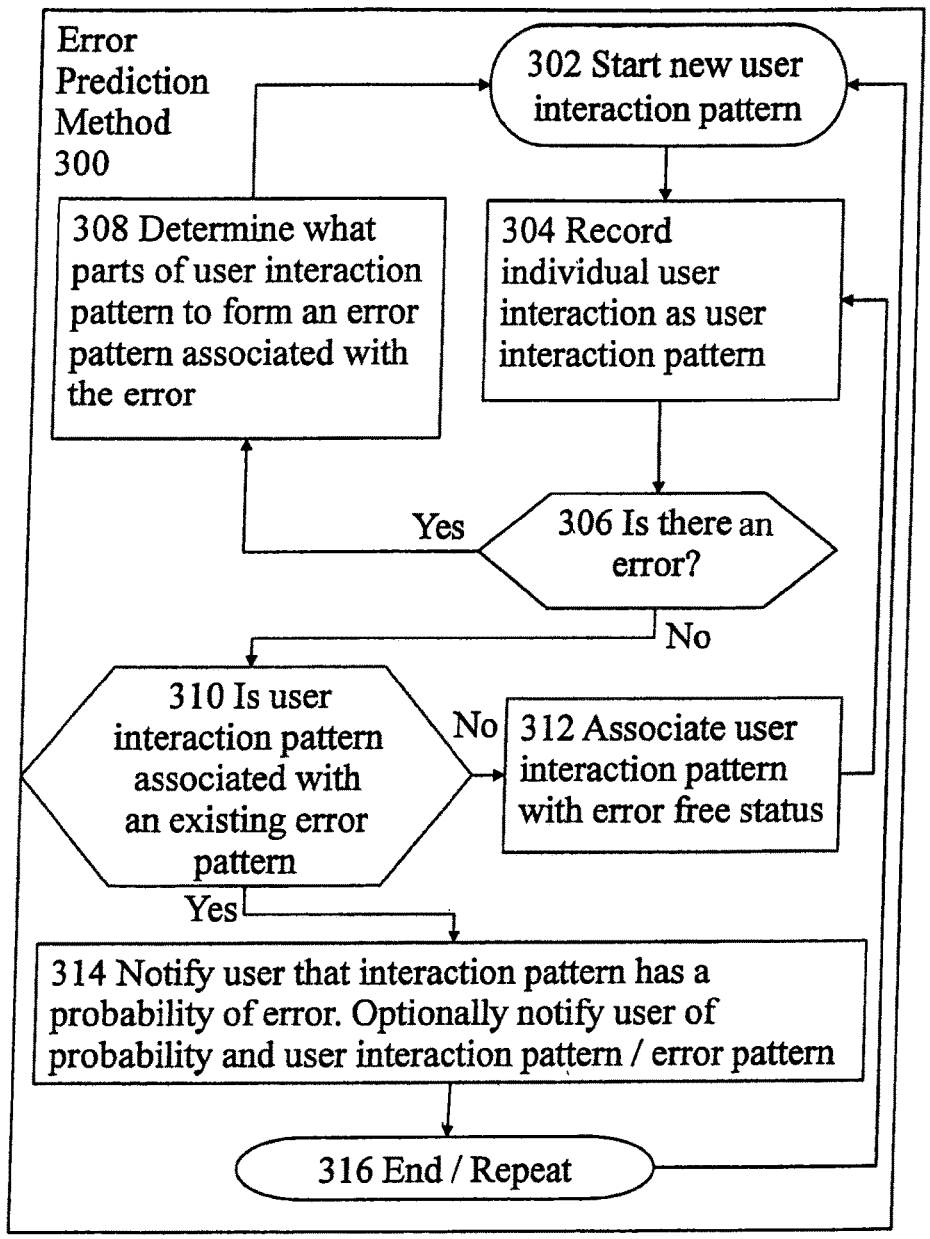
FIG. 3 is a flow diagram of a process of an embodiment.

Referring to FIG. 3, an embodiment of an error prediction method 300 comprises logical process steps 302 to 316. Although there is an order to the embodiment steps as described, the steps may not need to be in this strict order unless specified, and in other embodiments steps can be in a different order.

Step 302 is for starting a new user interaction pattern. New interaction pattern factory 202 creates an empty interaction pattern record in the interaction pattern table 250. This is initiated at the beginning of a user session or after an interaction pattern was associated with an existing error pattern. In the latter case, the very next user interaction after the associated interaction pattern is the start of the new user interaction pattern.

Step 304 is for recording an individual user interaction as a user interaction pattern. User interaction recorder 204 records an individual user interaction as part of a user interaction pattern in a user interaction session by listening to user events as they are created in the user interface of the operating system.

Step 306 is for branching to step 308 if an error is caused by the user input in the user interaction session. Otherwise, the process continues at step 310. One embodiment listens for errors at each user interaction but an error may only occur at a particular user interaction, such as a submit interaction. For instance, step 306 may ask error listener 206, "Is there an error that can be associated with the user interaction pattern?" (as recorded in step 304). Error listener 206 will be monitoring input and outputs of the application module. If a user interaction pattern causes an external system to respond with an error event, then the user interaction pattern will be associated with an error. For example, an interaction pattern setting up an HTTP channel with a port value of 480 will result in an error once the user has hit submit and not during the selection of HTTP or the value 480. In a different embodiment, checking for an error may only occur when the user input is sent to an application or an external system.

Step 308 is for determining what parts of the user interaction pattern form an error pattern to associate with the error. Step 308 is also for saving the error pattern and for returning to step 302. Interaction pattern association engine 208 determines which parts of the recorded user interaction pattern to associate with an error. The default determination is that the whole part of the recorded user interaction pattern is included. Some interactions will only require matching for major aspects of the interaction and these are determined using a user interaction masking pattern to isolate those aspects of the user interaction that are important.

Step 310 is for branching to step 314 if the user interaction pattern is associated with a user interaction error pattern. Otherwise, the process continues at step 312. Interaction pattern listener 210 determines if the user interaction pattern is associated with an error pattern by querying the interaction pattern table 250 with the user interaction pattern. In one embodiment, an association occurs if a user interaction pattern is above a threshold percentage of an existing error pattern. For example, if an existing error pattern contains a user interaction pattern and an additional 20% of other user interactions, then it would be defined as 80% similar; 10% above a 70% threshold and acceptable to be deemed associated.

Step 312 is for associating an intermediary user interaction pattern with error free status and then returning to step 304. In some embodiments, this step initiates a positive notification that the user interaction pattern is error free.

Step 314 is for notifying a user that an interaction pattern has a probability of causing an error because a similar user interaction error pattern has occurred before. Optionally, step 314 is also for notifying the user of the probability of the historical error and/or the user interaction pattern that caused the error.

Step 316 is the end of an iteration of the process and the process repeats at step 302.

Referring to FIG. 4A, an example interaction pattern table 250A for one embodiment is described. In this example, errors and occurrences for two users (user1 and user2) are recorded and a total of errors for all users and a total of occurrences for all users is calculated. Interaction pattern table 250A comprises user interaction error pattern records; each row (R1, R2, . . . , R10 in column 251A) of the table is a user interaction pattern record. Each user interaction pattern record comprises a user interaction pattern (in column 252A); values representing the number of errors (in column 254A) that occurred due to the user interaction pattern (a value for individual user1 and a value for user2 and a value for the total of all errors); and values representing the number of occurrences (in column 256A) of the user interaction pattern that have occurred (a value for user1, a value for user2, and a value for the total of all errors).

Interaction pattern table 250A stores patterns for, e.g., GUI P500; other examples could include further patterns for other GUIs. The order of the records is as is in this example because the table uses a hierarchical structure to define the patterns. For example, record R1 user interaction pattern is "P502/HTTP" representing that the user has selected a HTTP protocol for interface P502. The P number (the "502" in P502) represents the interface component and the adjacent value or string (following the forward slash character "/") is the value or string associated with the interface component. P502 is a text input box interface allowing a user to enter a protocol such as HTTP or HTTPS. P504 is a number input box allowing a user to enter a port number. P506 is a save and submit button for saving the network protocol value and port value and initiating a network set up process. See FIGS. 5A to 5C for representations of the interfaces P502, P504 and P506. Returning to FIG. 4A, record R2 ".+P504/443" comprises a breadcrumb character "." (a breadcrumb) defining a branch from the previous record (in this case R1) and therefore the addition of pattern "P504/443" so that the data repetition is minimized and the user interaction pattern R2 is read as "P502/HTTP+P504/443". In this sense the breadcrumb is similar to a breadcrumb used to reduce redundant information in a navigational user interface. However, using a breadcrumb is an approach to reduce redundant data and the data can be stored in any format that preserves the structure. In an alternative embodiment, no breadcrumbs are used and the data is stored as is to preserve the data structure. Record R3 ". .+P506" comprises two breadcrumbs or branches from the previous record (in this case R2) so that the actual user interaction pattern R3 is "P502/HTTP+P504/443+P506". The interaction patterns records R1 to R10 are described below.

R1="P502/HTTP". R1 represents the pattern of a user selecting HTTP for the P502 interface. User1 has selected this 22 times and user2 9 times giving a total of 31 selections. No errors have been attributed to this pattern.

R2="P502/HTTP+P504/443". R2 represents the pattern of a user selecting "HTTP" for the P502 interface and 433 for the P504 interface. User1 has selected this 3 times and user2 5 times giving a total of 8 selections. No errors have been attributed to this pattern.

R3="P502/HTTP+P504/443+P506". R3 represents the pattern of a user selecting HTTP for the P502 interface, 433 for the P504 interface; and then selecting the P506 button. User1 has selected this 3 times and user2 5 times giving a total of 8 selections. No errors have been attributed to this pattern. Note that this is essentially the same as R2 and that all users have completed the selection of P506 after a pattern of P504.

R4="P502/HTTP+P504/480". R4 represents the pattern of a user selecting HTTP for the P502 interface and 480 for the P504 interface. User1 has selected this pattern 4 times and user2 4 times giving a total of 8 selections.

R5="P502/HTTP+P504/480+P506". R5 represents the pattern of a user selecting HTTP for the P502 interface, 480 for the P504 interface and then selecting the P506 button. User1 has selected this pattern 3 times and user2 4 times giving a total of 7 times. User1 has 2 errors attributed to this pattern so that 2 of the 3 patterns would have resulted in an error. Extrapolating the chances of a future error for R5 are 2 out of 3 or 66% for user 1. User2 has 4 errors attributed to this pattern so that 4 of the 4 patterns would have resulted in an error. Extrapolating the chances of a future error for R5 are 4 out of 4 or 100% for user 2. The total number of errors is 6 for 7 occurrences.

When a user interaction pattern is the same as an existing error pattern R5, then the chances of future error are assumed by the embodiment to be the same as those recorded. However, when the user interaction pattern, is similar to an existing error pattern, then the chances of future error can be adapted from the recorded error probability. For instance, if the user interaction pattern is the same as R4, then the embodiment will deem it similar to existing error pattern R5. In this example, the difference is a submit button selection which is deemed to be a small difference so that the embodiment assumes the chances of future error to be very close to or the same as the recorded error probability for R6. The embodiment will deem R1 similar to R5 to a far lesser extent, and therefore, estimated a far lesser chance of future error.

R6="P502/HTTPS". R6 represents a pattern of a user selecting HTTPS for the P502 interface. User1 has selected this 11 times and user2 9 times giving a total of 20 selections. No errors are attributed.

R7="P502/HTTPS+P504/443". R7 represents a pattern of a user selecting HTTPS for the P502 interface and selecting 443 for the value of the P504 interface. User1 has selected this 3 times and user2 4 times giving a total of 7 selections. No errors are attributed.

R8="P502/HTTPS+P504/443+P506". R8 represents a pattern of a user selecting: HTTPS for the P502 interface; 443 for the value of the P504 interface; and then selecting the P506 button. User1 has selected this pattern 3 times and recorded 2 errors. User2 has selected this pattern 4 times and recorded 1 error. In total this pattern has been selected 7 times and received 3 errors.

R9="P502/HTTPS+P504/80". R9 represents a pattern of a user selecting: HTTPS for the P502 interface and port 80 for the P504 interface. User1 has selected this 2 times and user2 5 times giving a total of 7 selections. No errors are recorded.

R10="P502/HTTPS+P504/80+P506". R10 represents a pattern of a user selecting: HTTPS for the P502 interface; port 80 for the P504 interface; and the P506 button. User1 has selected this 2 times and user2 5 times giving a total of 7 selections. No errors are recorded.

Referring to FIG. 4B, an example interaction pattern table 250B for an alternative embodiment is described. In this example, errors and occurrences for all users are recorded with no distinction for individual users. Each error pattern in error pattern column 252B is described in full and the error values and occurrences in error column 254B and occurrences 256B are the same as in FIG. 4A.

Referring to FIG. 5A, an example screen showing an initial state of a graphical user interface GUI P500 of one embodiment is depicted. GUI P500 comprises: window control P501; text input interface P502; number input interface P504; and set up button P506.

Referring to FIG. 5B, an example screen showing an intermediary state of GUI P500 is described. In this example a user has entered HTTPS into P502 and 443 into P504. This state is equivalent to R7 before the P506 button is pressed or R8 after the P506 button is press. Referring to FIG. 3, steps 302, 304, 306, 310, 312 have been looped (once for an R7 pattern or twice for an R8 pattern) without any error or identification of a similar existing error pattern. When pattern R7 is identified (step 310) as a similar pattern, or R8 is identified as an identification pattern, then 3 errors out of 7 selections are located in the interaction table 250A (or 250B). Then, a notification P508 (at step 312) is made to notify the error. Such a notification can be a flashing or a highlighting window displaying the text as in P508. "Notification. Possible Error. HTTP and port 443 resulted in an error for 3 out of 7 users".

Referring to 5C, an example screen showing an intermediate state of GUI P500 is described. In this example a user has entered HTTP into P502 and 443 into P504. This state would be equivalent to R2 before the P506 button is pressed or R3 after the P506 button is press. No error is associated with these patterns so no notification need be displayed. However, positive notifications as well as warning notifications can be made by the error probability notifier 212 whereby when no error is found, then a positive notification can be made that states that no errors are predicted, at the same time as associating the user interaction pattern with an error free status in step 312. For example, in P510 "Notification. 8 out of 8 users selecting HTTP and port 443 had a successful set up."

As described herein, in an aspect of the invention, there is provided a method for predicting errors in a user interface interaction comprising: recording user interactions in a user interaction session, the user interactions forming a recorded user interaction pattern; checking the recorded user interaction pattern for a similar match against a set of error patterns, wherein each user error pattern is an historical user interaction pattern associated with an historical error status; and notifying the user that the recorded user interaction pattern is an error risk, if the recorded interaction pattern is similar to an error pattern that has generated an historical error.

In another aspect of the invention, there is provided an error prediction system for predicting errors in a user interface interaction comprising: a user interaction recorder for recording user interactions in a user interaction session, the user interactions forming a recorded user interaction pattern; an interaction pattern listener for checking the recorded user interaction pattern for a similar match against a set of error patterns that are associated with an error status; and an error probability notifier for notifying the user that the recorded user interaction pattern is an error risk, if the recorded interaction pattern is similar to an error pattern that generated an historical error.

In a further aspect of the invention, there is provided a computer program product for predicting errors in a user interface interaction, the computer program product comprising a computer readable storage medium having program instructions embodied therewith, the program instructions executable by a processor to cause the processor to: record user interactions in a user interaction session, the user interactions forming a recorded user interaction pattern; check the recorded user interaction pattern for a similar match against a set of error patterns, wherein each user error pattern is an historical user interaction pattern associated with an historical error status; and notify the user that the recorded user interaction pattern is an error risk, if the recorded interaction pattern is similar to an error pattern that has generated an historical error.

Further embodiments of the invention are now described. It will be clear to one of ordinary skill in the art that all or part of the logical process steps of one embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of one embodiment may be alternatively embodied in a logic apparatus comprising logic elements to perform the steps of the method, and that such logic elements may comprise components such as logic gates in, for example, a programmable logic array or an application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further embodiment, aspects of the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of one or more embodiments may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of aspects of the present invention.

What is claimed is:

1. A computer-implemented method of predicting runtime errors in a user interface interaction comprising:
    receiving text input from a user entering the text input during runtime on a device depicting a graphical user interface;
    recording, based on receiving the text input, user interactions in a user interaction session, said user interactions forming a recorded user interaction pattern for one or more graphical user interfaces of a computing environment;
    checking, by a processor of the computing environment, the recorded user interaction pattern, as the text input is being entered during runtime, for a similar match against a set of error patterns, wherein each error pattern is an historical user interaction pattern associated with an historical error status;
    notifying the user, by the processor, that the recorded user interaction pattern has a probability of causing an error, based on the recorded user interaction pattern being similar to an error pattern that has generated an historical error;
    determining a relevant portion of the recorded user interaction pattern for association with an error as an error pattern, based on the error occurring during the user interaction session; and
    notifying the user of a calculated value of the probability of the error, based on the recorded user interaction pattern being similar to the error pattern that has generated the historical error.

2. The computer-implemented method according to claim 1, further comprising notifying the user of the recorded user interaction pattern that resulted in a similar determination, based on the recorded user interaction pattern being similar to the error pattern that has generated the historical error.

3. The computer-implemented method according to claim 2, further comprising notifying the user of at least one of the error pattern that generated the historical error or the recorded user interaction pattern.

4. The computer-implemented method according to claim 1, wherein the set of error patterns is a collection of error patterns for multiple users of the user interface.

5. The computer-implemented method according to claim 1, wherein the set of error patterns is a collection of error patterns for a single user of the user interface.

6. The computer-implemented method according to claim 1, further comprising associating the recorded user interaction pattern with an error free state based on no error occurring in the user interaction session.

7. The computer-implemented method according to claim 1, wherein an error pattern is associated with at least one of an error identifier or a number of error occurrences.

8. The computer-implemented method according to claim 1, wherein an error pattern includes a user interface identifier and a state of one or more parameters of a user interface.

9. The computer-implemented method of claim 1, wherein the error is caused by the graphical user interface.

10. A computer program product for predicting runtime errors in a user interface interaction comprising:
    a computer readable storage medium readable by a processing circuit and storing instructions for execution by the processing circuit for performing a method comprising:
        receiving text input from a user entering the text input during runtime on a device depicting a graphical user interface;
        recording, based on receiving the text input, user interactions in a user interaction session, said user interactions forming a recorded user interaction pattern for one or more graphical user interfaces of a computing environment;
        checking, by a processor of the computing environment, the recorded user interaction pattern, as the text input is being entered during runtime, for a similar match against a set of error patterns, wherein each error pattern is an historical user interaction pattern associated with an historical error status;
        notifying the user, by the processor, that the recorded user interaction pattern has a probability of causing an error, based on the recorded user interaction pattern being similar to an error pattern that has generated an historical error;
        determining a relevant portion of the recorded user interaction pattern for association with an error as an error pattern, based on the error occurring during the user interaction session; and
        notifying the user of a calculated value of the probability of the error, based on the recorded user interaction pattern being similar to the error pattern that has generated the historical error.

11. The computer program product according to claim 10, wherein the method further comprises notifying the user of the recorded user interaction pattern that resulted in a similar determination, based on the recorded user interaction pattern being similar to the error pattern that has generated the historical error.

12. The computer program product according to claim 10, wherein the method further comprises associating the recorded user interaction pattern with an error free state based on no error occurring in the user interaction session.

13. The computer program product of claim 10, wherein the error is caused by the graphical user interface.

14. A computer system for predicting runtime errors in a user interface interaction comprising:
   a memory; and
   a processor in communication with the memory, wherein the computer system is configured to perform a method, said method comprising:
      receiving text input from a user entering the text input during runtime on a device depicting a graphical user interface;
      recording, based on receiving the text input, user interactions in a user interaction session, said user interactions forming a recorded user interaction pattern for one or more graphical user interfaces of a computing environment;
      checking, by a processor of the computing environment, the recorded user interaction pattern, as the text input is being entered during runtime, for a similar match against a set of error patterns, wherein each error pattern is an historical user interaction pattern associated with an historical error status;
      notifying the user, by the processor, that the recorded user interaction pattern has a probability of causing an error, based on the recorded user interaction pattern being similar to an error pattern that has generated an historical error;
      determining a relevant portion of the recorded user interaction pattern for association with an error as an error pattern, based on the error occurring during the user interaction session; and
      notifying the user of a calculated value of the probability of the error, based on the recorded user interaction pattern being similar to the error pattern that has generated the historical error.

15. The computer system according to claim 14, wherein the method further comprises notifying the user of the recorded user interaction pattern that resulted in a similar determination, based on the recorded user interaction pattern being similar to the error pattern that has generated the historical error.

16. The computer system according to claim 14, wherein the method further comprises associating the recorded user interaction pattern with an error free state based on no error occurring in the user interaction session.

17. The computer system of claim 14, wherein the error is caused by the graphical user interface.

* * * * *